United States Patent
Luo

(10) Patent No.: US 12,045,642 B2
(45) Date of Patent: Jul. 23, 2024

(54) VIRTUAL MACHINE MANAGEMENT METHOD AND APPARATUS FOR CLOUD PLATFORM

(71) Applicant: Huawei Cloud Computing Technologies, Co., Ltd., Guizhou (CN)

(72) Inventor: Sibiao Luo, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 548 days.

(21) Appl. No.: 17/202,806

(22) Filed: Mar. 16, 2021

(65) Prior Publication Data

US 2021/0224099 A1 Jul. 22, 2021

Related U.S. Application Data

(63) Continuation of application No. PCT/CN2019/105681, filed on Sep. 12, 2019.

(30) Foreign Application Priority Data

Sep. 17, 2018 (CN) .......................... 201811082104.6

(51) Int. Cl.
*G06F 9/455* (2018.01)
*G06F 8/61* (2018.01)
(Continued)

(52) U.S. Cl.
CPC ............ *G06F 9/45558* (2013.01); *G06F 8/63* (2013.01); *G06F 9/4406* (2013.01);
(Continued)

(58) Field of Classification Search
None
See application file for complete search history.

(56) References Cited

U.S. PATENT DOCUMENTS 8,468,139 B1 6/2013 O'Connor et al.
8,832,032 B2 9/2014 O'Connor et al.
(Continued)

FOREIGN PATENT DOCUMENTS

CN 101563871 A 10/2009
CN 103229142 A 7/2013
(Continued)

OTHER PUBLICATIONS

Varia, J., "Amazon Web Services—Migrating Your Existing Applications to the AWS Cloud—A Phase-driven Approach to Cloud Migration," Oct. 1, 2010, pp. 1-23, XP055155825, 23 pages.
(Continued)

*Primary Examiner* — Umut Onat
(74) *Attorney, Agent, or Firm* — Conley Rose, P.C.

(57) ABSTRACT

A virtual machine management method and apparatus for a cloud platform includes, when a client selects a Bring Your Own License mode, obtaining a first client image file, where the first client image file carries a first software operating environment, configuring the first client image file based on the first license, to generate a first cloud platform image file, creating a first virtual machine based on the first cloud platform image file, where the first software operating environment is set on the first virtual machine, and exempting a license fee of the software in the first software operating environment in the first virtual machine.

26 Claims, 8 Drawing Sheets

(51) Int. Cl.
*G06F 9/4401* (2018.01)
*G06F 21/10* (2013.01)

(52) U.S. Cl.
CPC .. *G06F 21/105* (2013.01); *G06F 2009/45562* (2013.01); *G06F 2009/45595* (2013.01)

(56) References Cited

U.S. PATENT DOCUMENTS

| | | | |
|---|---|---|---|
| 2008/0147530 | A1 | 6/2008 | Kwan et al. |
| 2011/0213713 | A1* | 9/2011 | Ferris ................ G06Q 30/0601 705/26.1 |
| 2011/0213719 | A1 | 9/2011 | Ferris et al. |
| 2012/0216269 | A1 | 8/2012 | Yeung et al. |
| 2013/0227564 | A1 | 8/2013 | Asayama |
| 2013/0263113 | A1 | 10/2013 | Cavazza et al. |
| 2015/0113533 | A1 | 4/2015 | Hui et al. |
| 2015/0381435 | A1 | 12/2015 | Todd et al. |
| 2016/0070891 | A1 | 3/2016 | Angelov et al. |
| 2016/0112497 | A1 | 4/2016 | Koushik et al. |
| 2016/0132214 | A1* | 5/2016 | Koushik .................. G06F 8/61 715/741 |
| 2018/0095975 | A1 | 4/2018 | McLaren |
| 2018/0113999 | A1 | 4/2018 | Azmat |
| 2018/0247082 | A1 | 8/2018 | Durham et al. |
| 2018/0276023 | A1* | 9/2018 | Matsueda .............. G06Q 30/04 |
| 2018/0357097 | A1* | 12/2018 | Poort ...................... H04L 67/01 |
| 2019/0250960 | A1 | 8/2019 | Zhang et al. |
| 2021/0224099 | A1 | 7/2021 | Luo |

FOREIGN PATENT DOCUMENTS

| | | |
|---|---|---|
| CN | 104572239 A | 4/2015 |
| CN | 104679574 A | 6/2015 |
| CN | 105100067 A | 11/2015 |
| CN | 105573830 A | 5/2016 |
| CN | 106911744 A | 6/2017 |
| CN | 107734018 A | 2/2018 |
| CN | 107888695 A | 4/2018 |
| CN | 108132826 A | 6/2018 |
| CN | 109460281 A | 3/2019 |
| JP | 2013178624 | 9/2013 |
| JP | 2017058711 A | 3/2017 |

OTHER PUBLICATIONS

Meng, Z., "The Study of SIS System Application on Virtual Technology," Jan. 1, 2013, 65 pages.
Whalley, I., et al, "Licence-aware management of virtual machines," Aug. 1, 2012, 8 pages.
Peng, H., "The Research and Application of the Key Technologies of Cloud Computing Management Platform Based on Cloudstack," Jun. 1, 2013, 67 pages.

* cited by examiner

US 12,045,642 B2

VIRTUAL MACHINE MANAGEMENT METHOD AND APPARATUS FOR CLOUD PLATFORM

CROSS-REFERENCE TO RELATED APPLICATIONS

This application is a continuation of International Patent Application No. PCT/CN2019/105681 filed on Sep. 12, 2019, which claims priority to Chinese Patent Application No. 201811082104.6 filed on Sep. 17, 2018. The disclosures of the aforementioned applications are hereby incorporated by reference in their entireties.

TECHNICAL FIELD

This application relates to the cloud processing field, and in particular, to a virtual machine management method and apparatus for a cloud platform.

BACKGROUND

A cloud platform is a platform that can provide computing and storage services. The cloud platform usually includes a cloud server cluster. The cloud server refers to a physical server that can provide an elastic computing service (ECS). Currently, the cloud platform includes a public cloud platform, a private cloud platform, a hybrid cloud platform, and the like. Data migration to the cloud refers to sending data of a local virtual machine, data of a source cloud platform, or data of an internet data center (IDC) equipment room to a destination cloud platform, and the destination cloud platform stores corresponding data. The data of the virtual machine includes at least one of disk data, memory data, and device status data.

If the data migrated to the destination cloud platform is charged data, the data can be used only after a related license is activated. For example, after data of a charging operating system is migrated to the destination cloud platform, the operating system can be used only after the operating system is activated and authorized by using an operating system license provided by an operating system vendor. For another example, after data of a charging application software is migrated to the destination cloud platform, the application software can be used only after the application software is activated and authorized by using a software license provided by an independent software vendor (ISV).

In a related technology, after uploading an image file of the data to the destination cloud platform, the user needs to manually activate the operating system or the application software based on a migration service supported by the destination cloud platform, to complete data migration. An operation is complex, and convenience is relatively low. The cloud platform supports a migration service in a Bring Your Own License mode or a migration service in a Buy License From Platform mode.

SUMMARY

Embodiments of this application provide a virtual machine management method and apparatus for a cloud platform, to resolve a problem in a related technology that an operation of data migration to the cloud is complex and relatively low convenient. The technical solutions are as follows.

According to a first aspect, a virtual machine management method for a cloud platform is provided. The method includes obtaining a first client image file and a first license, where the first client image file carries a first software operating environment, and the first license is used to authenticate software in the first software operating environment, configuring the first client image file based on the first license to generate a first cloud platform image file, where the first cloud platform image file carries a no-charging identifier, creating a first virtual machine based on the first cloud platform image file, where the first software operating environment is set on the first virtual machine, and the first virtual machine carries the no-charging identifier, and exempting a license fee of the software in the first software operating environment in the first virtual machine based on the no-charging identifier.

It should be noted that the cloud platform provided in this embodiment of this application supports both a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates the virtual machine and activates software in the virtual machine based on the first license. In other words, this implements fully automatic processing on the first client image file, improves convenience of switching an enterprise service to the cloud, and further improves user experience. In addition, a migration to the cloud service in a Bring Your Own License mode is provided to enable an enterprise service to be smoothly switched to the cloud. A virtual machine created in a Bring Your Own License mode carries a no-charging identifier. The cloud platform does not charge an additional license fee of the software in a Bring Your Own License mode during software operation. This reduces maintenance and operation costs of the enterprise.

Optionally, the software in the first software operating environment is an operating system, and the configuring the first client image file based on the first license to generate a first cloud platform image file includes obtaining a first script based on the first license, and setting the first script in the first client image file, to obtain the first cloud platform image file, where the first script is used to, when the first virtual machine is started, detect whether a second license is set on an operating system of the first virtual machine, and if the second license is set on the operating system of the first virtual machine, clear the second license, and set the first license on the operating system, or if the second license is not set on the operating system of the first virtual machine, set the first license on the operating system.

It should be noted that, when the first virtual machine is started, it is detected whether the license provided by the cloud platform is set on the operating system of the first virtual machine, and if the license provided by the cloud platform is set on the operating system of the first virtual machine, the license is cleared. This can prevent the client from stealing the license provided by the cloud platform after exporting the operating system from the virtual machine of the cloud platform.

In a possible implementation, the operating system is a WINDOWS® operating system, and the first script is used to, when the first virtual machine is started, detect whether the second license is set in a registry of the WINDOWS® operating system of the first virtual machine, and if the second license is set in the registry, clear the second license in the registry, set the first license in the registry, and activate the first license in the registry, or if the second license is not set in the registry, set the first license in the registry, and activate the first license in the registry.

In another possible implementation, the operating system is a LINUX operating system, and the first script is used to, when the first virtual machine is started, detect whether a second license is set in a software repository configuration file of the LINUX operating system of the first virtual machine, and if the second license is set in the software repository configuration file, clear the second license in the software repository configuration file, and set the first license in the software repository configuration file, or if the second license is not set in the software repository configuration file, set the first license in the software repository configuration file.

It should be noted that, for a WINDOWS® operating system in a Bring Your Own License mode, license clearing is performed on the client image file, to prevent the client from stealing the license provided by the cloud platform and exempt a license fee for activating and running the WINDOWS® operating system. For a LINUX operating system in a Bring Your Own License mode, software package source address clearing and license clearing are performed on the software repository configuration file of the client image file, to prevent the client from stealing the software package source service provided by the cloud platform and exempt a license fee for running the LINUX operating system.

Optionally, the method further includes obtaining a second client image file, where the second client image file carries a second software operating environment, configuring the second client image file based on a third license provided by the cloud platform to generate a second cloud platform image file, where the second cloud platform image file carries a charging identifier, and the third license is used to authenticate software in the second software operating environment, creating a second virtual machine based on the second cloud platform image file, where the second software operating environment is set on the second virtual machine, and the second virtual machine carries the charging identifier, and charging a license fee of the software in the second software operating environment in the second virtual machine based on the charging identifier.

According to a second aspect, a virtual machine management method for a cloud platform is provided. The method includes obtaining a second client image file, where the second client image file carries a second software operating environment, configuring the second client image file based on a third license provided by the cloud platform to generate a second cloud platform image file, where the second cloud platform image file carries a charging identifier, and the third license is used to authenticate software in the second software operating environment, creating a second virtual machine based on the second cloud platform image file, where the second software operating environment is set on the second virtual machine, and the second virtual machine carries the charging identifier, and charging a license fee of the software in the second software operating environment in the second virtual machine based on the charging identifier.

It should be noted that the cloud platform provided in this embodiment of this application supports both a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates a virtual machine and activates software in the virtual machine based on the third license provided by the cloud platform. In other words, this implements fully automatic processing on the second client image file, improves convenience of switching an enterprise service to the cloud, and further improves user experience.

Optionally, the software in the second software operating environment is an operating system, and the configuring the second client image file based on a third license provided by the cloud platform to generate a second cloud platform image file includes obtaining a second script based on the third license, and setting the second script in the second client image file, to obtain the second cloud platform image file, where the second script is used to, when the second virtual machine is started, detect whether a fourth license is set on an operating system of the second virtual machine, and if the fourth license is set on the operating system of the second virtual machine, clear the fourth license, and set the third license on the operating system, or if the fourth license is not set on the operating system of the second virtual machine, set the third license on the operating system.

In a possible implementation, the operating system is a WINDOWS® operating system, and the second script is used to, when the second virtual machine is started, detect whether the fourth license is set in a registry of the WINDOWS® operating system of the second virtual machine, and if the fourth license is set in the registry, clear the fourth license in the registry, set the third license in the registry, and activate the third license in the registry, or if the fourth license is not set in the registry, set the third license in the registry, and activate the third license in the registry.

In another possible implementation, the operating system is a LINUX operating system, and the second script is used to, when the second virtual machine is started, detect whether the fourth license is set in a software repository configuration file of the LINUX operating system of the second virtual machine, and if the fourth license is set in the software repository configuration file, clear the fourth license in the software repository configuration file, and set the third license in the software repository configuration file, or if the fourth license is not set in the software repository configuration file, set the third license in the software repository configuration file.

It should be noted that, according to the virtual machine management method for the cloud platform provided in this embodiment of this application, for a WINDOWS® operating system for which a license is purchased by the platform, a platform license is implanted into the client image file, and subsequently, when a created virtual machine is started, key management service (KMS) is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier.

According to a third aspect, a virtual machine management apparatus for a cloud platform is provided. The apparatus includes a first obtaining module, configured to obtain a first client image file and a first license, where the first client image file carries a first software operating environment, and the first license is used to authenticate software in the first software operating environment, a first generation module, configured to configure the first client image file based on the first license to generate a first cloud platform image file, where the first cloud platform image file carries a no-charging identifier, a first creation module, configured to create a first virtual machine based on the first cloud platform image file, where the first software operating environment is set on the first virtual machine, and the first virtual machine carries the no-charging identifier, and a fee exemption module, configured to exempt a license fee of the software in the first software operating environment in the first virtual machine based on the no-charging identifier.

Optionally, the software in the first software operating environment is an operating system, and the first generation module is configured to obtain a first script based on the first license, and set the first script in the first client image file, to obtain the first cloud platform image file, where the first script is used to, when the first virtual machine is started, detect whether a second license is set on an operating system of the first virtual machine, and if the second license is set on the operating system of the first virtual machine, clear the second license, and set the first license on the operating system, or if the second license is not set on the operating system of the first virtual machine, set the first license on the operating system.

Optionally, the operating system is a WINDOWS® operating system, and the first script is used to, when the first virtual machine is started, detect whether the second license is set in a registry of the WINDOWS® operating system of the first virtual machine, and if the second license is set in the registry, clear the second license in the registry, set the first license in the registry, and activate the first license in the registry, or if the second license is not set in the registry, set the first license in the registry, and activate the first license in the registry.

Optionally, the operating system is a LINUX operating system, and the first script is used to, when the first virtual machine is started, detect whether a second license is set in a software repository configuration file of the LINUX operating system of the first virtual machine, and if the second license is set in the software repository configuration file, clear the second license in the software repository configuration file, and set the first license in the software repository configuration file, or if the second license is not set in the software repository configuration file, set the first license in the software repository configuration file.

Optionally, the apparatus further includes a second obtaining module, configured to obtain a second client image file, where the second client image file carries a second software operating environment, a second generation module, configured to configure the second client image file based on a third license provided by the cloud platform to generate a second cloud platform image file, where the second cloud platform image file carries a charging identifier, and the third license is used to authenticate software in the second software operating environment, a second creation module, configured to create a second virtual machine based on the second cloud platform image file, where the second software operating environment is set on the second virtual machine, and the second virtual machine carries the charging identifier, and a charging module, configured to charge a license fee of the software in the second software operating environment in the second virtual machine based on the charging identifier.

According to a fourth aspect, a virtual machine management apparatus for a cloud platform is provided. The apparatus includes an obtaining module, configured to obtain a second client image file, where the second client image file carries a second software operating environment, a generation module, configured to configure the second client image file based on a third license provided by the cloud platform to generate a second cloud platform image file, where the second cloud platform image file carries a charging identifier, and the third license is used to authenticate software in the second software operating environment, a creation module, configured to create a second virtual machine based on the second cloud platform image file, where the second software operating environment is set on the second virtual machine, and the second virtual machine carries the charging identifier, and a charging module, configured to charge a license fee of the software in the second software operating environment in the second virtual machine based on the charging identifier.

Optionally, the software in the second software operating environment is an operating system, and the generation module is configured to obtain a second script based on the third license, and set the second script in the second client image file, to obtain the second cloud platform image file, where the second script is used to, when the second virtual machine is started, detect whether a fourth license is set on an operating system of the second virtual machine, and if the fourth license is set on the operating system of the second virtual machine, clear the fourth license, and set the third license on the operating system, or if the fourth license is not set on the operating system of the second virtual machine, set the third license on the operating system.

Optionally, the operating system is a WINDOWS® operating system, and the second script is used to, when the second virtual machine is started, detect whether the fourth license is set in a registry of the WINDOWS® operating system of the second virtual machine, and if the fourth license is set in the registry, clear the fourth license in the registry, set the third license in the registry, and activate the third license in the registry, or if the fourth license is not set in the registry, set the third license in the registry, and activate the third license in the registry.

Optionally, the operating system is a LINUX operating system, and the second script is used to, when the second virtual machine is started, detect whether the fourth license is set in a software repository configuration file of the LINUX operating system of the second virtual machine, and if the fourth license is set in the software repository configuration file, clear the fourth license in the software repository configuration file, and set the third license in the software repository configuration file, or if the fourth license is not set in the software repository configuration file, set the third license in the software repository configuration file.

According to a fifth aspect, a virtual machine management apparatus for a cloud platform is provided. The apparatus includes a storage unit, configured to store an instruction, and at least one processor, coupled to the storage unit, where when the at least one processor executes the instruction, any virtual machine management method for the cloud platform according to the first aspect is implemented, or any virtual machine management method for the cloud platform according to the second aspect is implemented.

According to a sixth aspect, a computer-readable storage medium is provided. The computer-readable storage medium stores an instruction, and when the instruction is executed by a processor, any virtual machine management method for the cloud platform according to the first aspect is implemented, or any virtual machine management method for the cloud platform according to the second aspect is implemented.

According to a seventh aspect, a virtual machine management system for a cloud platform is provided. The system includes the cloud platform and at least one client, where the cloud platform includes any virtual machine management apparatus for the cloud platform according to the third aspect or the fourth aspect.

Beneficial effects brought by the technical solutions provided in the embodiments of this application include the following.

The cloud platform is compatible with a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates the virtual machine and activates software in the virtual machine based on a license. In other words, this implements fully automatic processing on the client image file, improves convenience of switching an enterprise service to the cloud, and further improves user experience. For a WINDOWS® operating system in a Bring Your Own License mode, license clearing is performed on the client image file, to prevent the client from stealing the license provided by the cloud platform and exempt a license fee for activating and running the WINDOWS® operating system. For a LINUX operating system in a Bring Your Own License mode, software package source address clearing and license clearing are performed on the software repository configuration file of the client image file, to prevent the client from stealing the software package source service provided by the cloud platform and exempt a license fee for running the LINUX operating system. According to the cloud platform provided in this embodiment of this application, a migration to the cloud service in a Bring Your Own License mode is provided to enable an enterprise to be smoothly switched to the cloud, and no additional license fee of software in a Bring Your Own License mode is charged. This reduces maintenance and operation costs of the enterprise. For a WINDOWS® operating system for which a license is purchased by the platform, a platform license is implanted into the client image file, and subsequently, when a created virtual machine is started, KMS is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier.

DESCRIPTION OF EMBODIMENTS

To make the objectives, technical solutions, and advantages of this application clearer, the following further describes the implementations of this application in detail with reference to the accompanying drawings.

Figure 1:
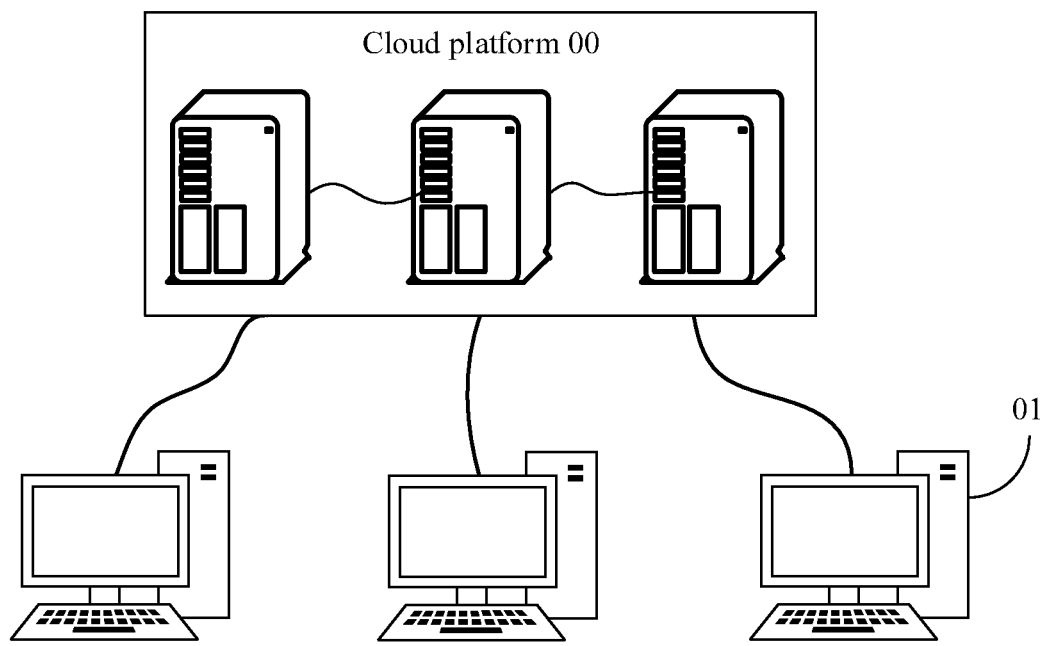
FIG. 1 is a schematic structural diagram of a virtual machine management system for a cloud platform according to an embodiment of this application.

FIG. 1 is a schematic structural diagram of a virtual machine management system for a cloud platform according to an embodiment of this application. As shown in FIG. 1, the system includes a cloud platform 00 and at least one client 01.

The cloud platform 00 may be a cloud server, or a cloud server cluster including several cloud servers. The client 01 may be installed in a terminal device such as a computer, a tablet computer, or a smartphone. Each client 01 establishes a connection to the cloud platform 00 by using a wireless network or a wired network.

Figure 2:
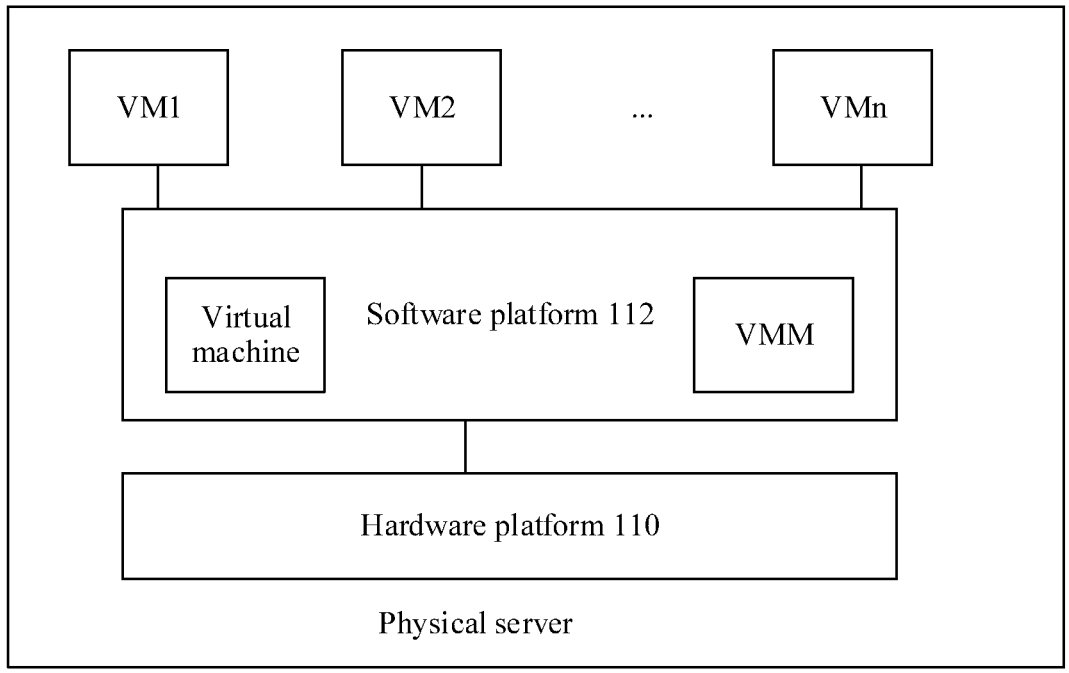
FIG. 2 is a schematic structural diagram of composition of a physical server that constitutes a cloud platform according to an embodiment of this application.
Figure 3:
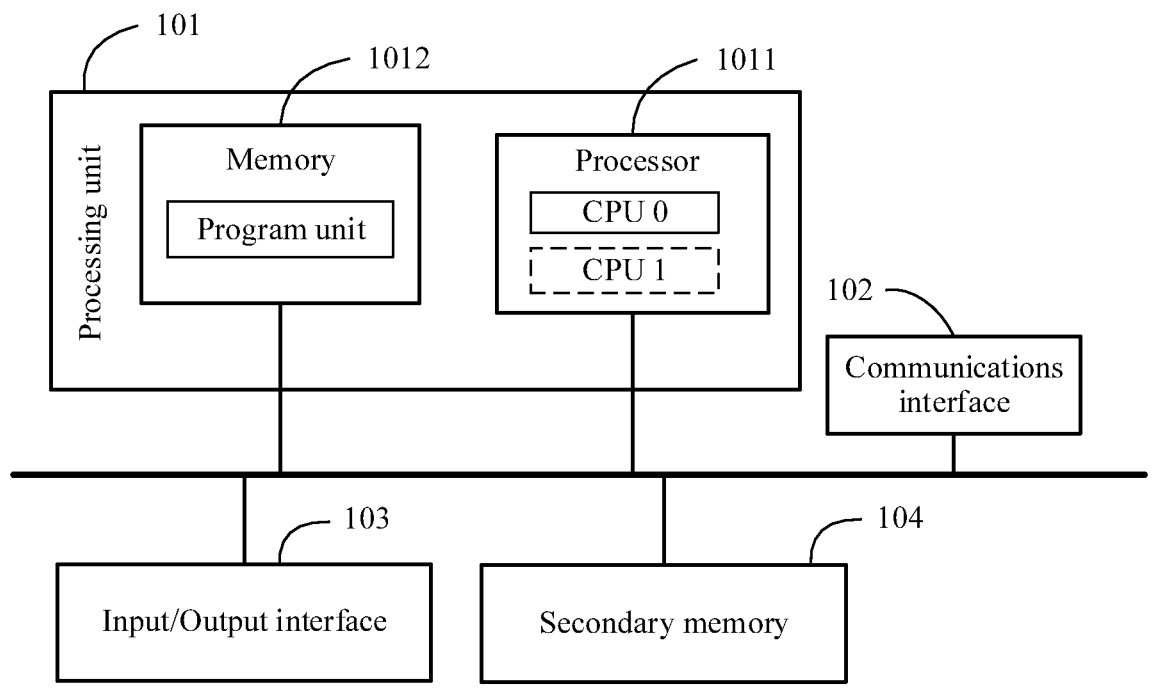
FIG. 3 is a schematic structural diagram of composition of another physical server that constitutes a cloud platform according to an embodiment of this application.

The cloud server is a physical server that provides an ECS. FIG. 2 and FIG. 3 each are schematic diagrams of composition of a physical server. FIG. 2 shows a deployment status of software and hardware in the physical server, and FIG. 3 shows a hardware composition status of the physical server. Referring to FIG. 2, the physical server includes a hardware platform 110. The hardware platform 110 may include a hard disk, a central processing unit (CPU), a network interface, a memory, and the like in a physical structure of the server. A software platform 112 may run on the hardware platform 110, and the software platform 112 may include software such as virtualization software, an operating system of a virtual machine, communication software of a virtual machine, and application software of a virtual machine. The virtualization software (such as a hypervisor) is an intermediate layer between physical hardware and the virtual machine, and is responsible for coordinating access of each virtual machine to the hardware platform. The hypervisor is also referred to as a virtual machine monitor (VMM), and the VMM may include a virtual hardware platform for implementing the virtual machine. The virtual hardware platform includes a virtualized memory, a virtualized CPU, a virtualized hard disk, a virtualized display adapter, a virtualized network interface, and the like. A plurality of virtual machines 1 to n run on the VMM. A software system of the virtual machine runs on the virtual hardware platform in the VMM. Communication between virtual machines requires a virtual switch, and the software platform 112 further includes communication software of the virtual machines, for example, a virtual switch.

Referring to FIG. 3, the physical server may include a processing unit 101 and a communications interface 102. The processing unit 101 is configured to execute functions defined by an operating system and various software programs that run on the physical server, for example, functions of various software components on the software platform 112 shown in FIG. 2. For example, the processing unit is configured to implement a function of the VMM, or configured to implement a function of the virtual switch, or configured to implement a function of the virtual machine. The communications interface 102 is configured to communicate and interact with another device. The another device may be another physical server. Optionally, the communications interface 102 may be a network adapter card. Optionally, the physical server may further include an input/output interface 103. The input/output interface 103 is connected to an input/output device, and is configured to receive input information and output an operation result. The input/output interface 103 may be a mouse, a keyboard, a display, a compact disc (CD)-read-only memory (ROM) drive, or the like. Optionally, the physical server may further include a secondary memory 104, which is generally referred to as an external memory. A storage medium of the secondary memory 104 may be a magnetic medium (for example, a floppy disk, a hard disk, or a magnetic tape), an optical medium (for example, an optical disc), a semiconductor medium (for example, a solid-state drive), or the like. The processing unit 101 may have a plurality of specific implementations. For example, the processing unit 101 may include a processor 1011 and a memory 1012. The processor 1011 performs a related operation based on a program unit stored in the memory 1012. The processor 1011 may be a CPU or a graphics processing unit (GPU), where the processor 1011 may be a single-core processor or a multi-core processor. Alternatively, the processing unit 101 may be independently implemented by using a logic device with built-in processing logic, for example, a field programmable gate array (FPGA) or a digital signal processor (DSP). In addition, FIG. 2 is merely an example of a physical server. The physical server may include more or fewer components than those shown in FIG. 2, or may have different component configuration manners.

Figure 4:
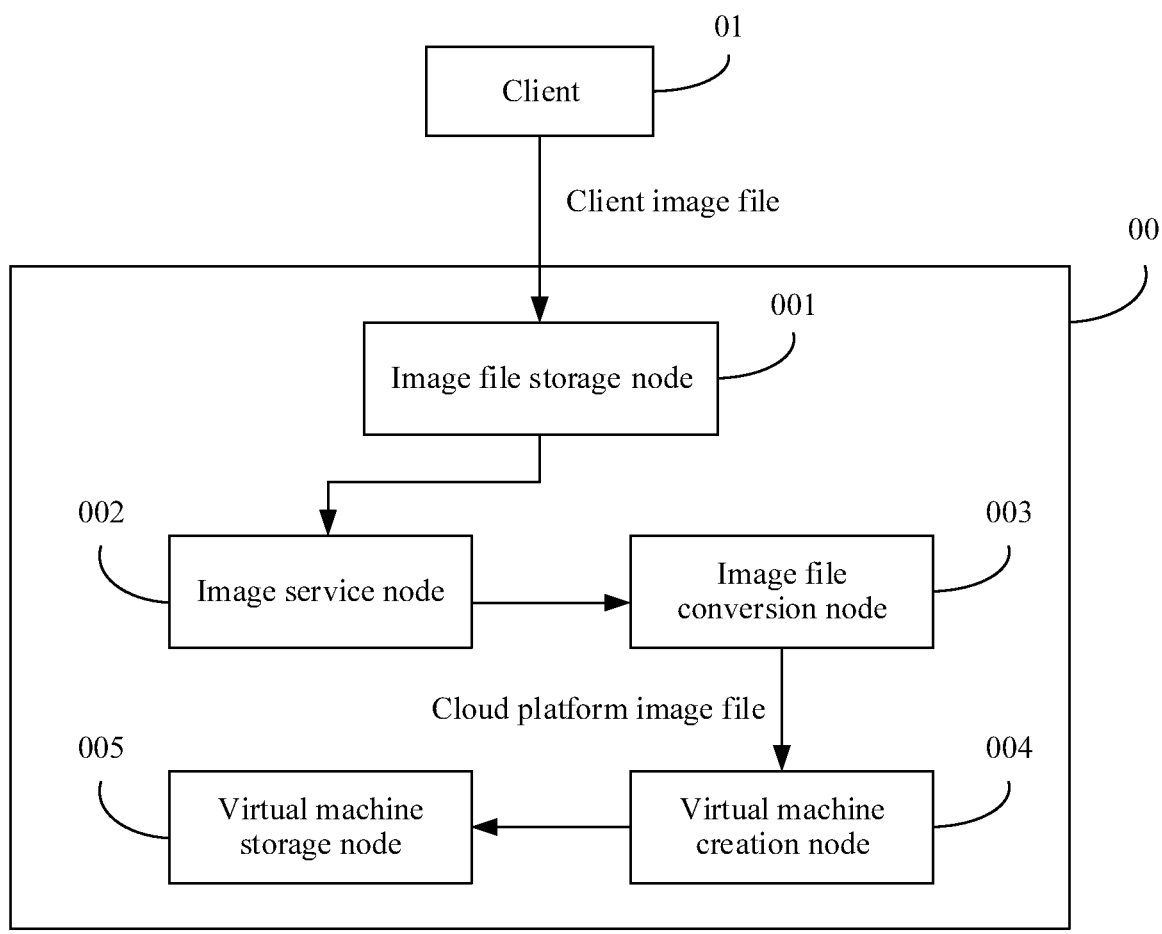
FIG. 4 is a schematic structural diagram of a cloud platform according to an embodiment of this application.

Optionally, FIG. 4 is a schematic structural diagram of a cloud platform according to an embodiment of this application. As shown in FIG. 4, a cloud platform 00 includes a plurality of computing nodes, and the plurality of computing nodes include an image file storage node 001, an image service node 002, an image file conversion node 003, a virtual machine creation node 004, and a virtual machine storage node 005. Each computing node may be a cloud server, and communication between the computing nodes may be performed in an interconnection bus or network connection manner. Alternatively, a plurality of computing nodes are integrated into a same cloud server. This is not limited in this embodiment of this application.

After obtaining data of software in a software operating environment to generate a client image file, a client 01 uploads the client image file to the image file storage node 001. Optionally, an image format of the client image file may be a community format such as vhd, qcow2, zvhd, or vmdk. An image format of the client image file is not limited in this embodiment of this application. The software in the software operating environment includes an operating system and application software. The software operating environment may be a software operating environment of a data center such as a local virtual machine, a public cloud platform, a private cloud platform, a hybrid cloud platform, and an IDC equipment room. A hardware carrier of the software operating environment is not limited in this application.

The image file storage node 001 is configured to store the client image file uploaded by the client 01. The image file storage node 001 may be an object storage service (OSS) user bucket.

The image service node 002 is configured to provide a combined application programming interface (API) service. The combined API downloads the client image file from the image file storage node 001, and transmits the client image file to the image file conversion node 003.

The image file conversion node 003 is configured to convert an image format of the client image file into a specified image format. An image file in the specified image format may support large-scale mounting. For example, the specified image format may be a quick emulator (QEMU) copy on write 2 (qcow2) format. In a WINDOWS® operating system, mounting usually refers to assigning a drive letter to a disk partition (including a virtualized disk partition). Third-party software, such as disk partition management software and virtual disk software, also provides a mounting function. In a LINUX operating system, mounting refers to mounting a device (usually a storage device) to an existing directory. The image file conversion node 003 is further configured to, after the client image file in the specified image format is mounted, perform background permission processing on the client image file, and convert the image format of the image file into a target format supported by the cloud platform. For example, the target format may be a zvhd format, to obtain a cloud platform image file. The background permission processing includes license clearing processing and license implantation processing, or the background permission processing includes license implantation processing. For an implementation process of the background permission processing, refer to the method embodiment.

The virtual machine creation node 004 is configured to create a virtual machine based on the cloud platform image file.

The virtual machine storage node 005 is configured to store the virtual machine created by the virtual machine creation node 004.

Figure 5:
FIG. 5 is a schematic diagram of displaying a mirror service control interface on a client according to an embodiment of this application.

It should be noted that the cloud platform provided in this embodiment of this application supports both a migration service in a Bring Your Own License mode and a migration service in a BLEP mode. The cloud platform provides an image file migration service for the client. The client displays an image service control interface on a display page. For example, FIG. 5 is a schematic diagram of displaying an image service control interface on a client according to an embodiment of this application. As shown in FIG. 5, the image service control interface includes a license type option, and the license type option includes a Bring Your Own License option and a BLEP option. After receiving an instruction for triggering the Bring Your Own License option on the image service control interface, the cloud platform executes a virtual machine management method corresponding to the Bring Your Own License mode. After receiving an instruction for triggering the BLEP option on the image service control interface, the cloud platform executes a virtual machine management method corresponding to the BLEP mode. Referring to FIG. 5, the image service control interface further includes an image file upload box, a name text box, and an operating system version selection box. The image file upload box is used to select a client image file that needs to be uploaded from the client, the name text box is used to enter a name of the client image file, and the operating system version selection box is used to select an operating system version of the client image file that is selected to be uploaded. Content and a type of an interface element of the image service control interface are not limited in this embodiment of this application.

The following embodiments of this application separately describe an implementation process of the virtual machine management method corresponding to the Bring Your Own License mode and an implementation process of the virtual machine management method corresponding to the BLEP mode.

Figure 6:
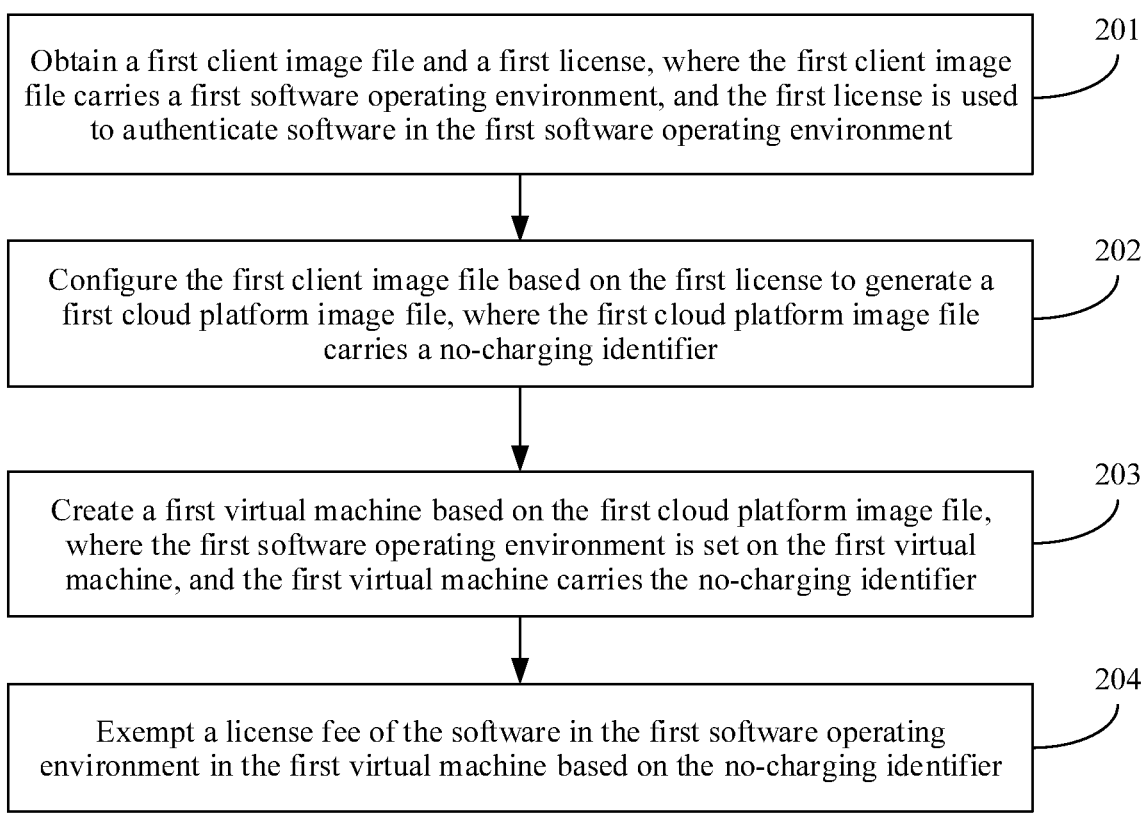
FIG. 6 is a flowchart of a virtual machine management method for a cloud platform according to an embodiment of this application.

FIG. 6 is a flowchart of a virtual machine management method for a cloud platform corresponding to a Bring Your Own License mode according to an embodiment of this application. The method may be applied to the cloud platform 00 in the system shown in FIG. 1. As shown in FIG. 6, the method includes the following steps.

In step 201, a first client image file and a first license are obtained, where the first client image file carries a first software operating environment, and the first license is used to authenticate software in the first software operating environment.

Optionally, the first client image file is sent by a first client to the cloud platform. An image format of the first client image file may be a community format such as vhd, qcow2, zvhd, or vmdk. An image format of the first client image file is not limited in this embodiment of this application.

Optionally, the software in the first software operating environment may be an operating system or application software. When the software in the first software operating environment is the operating system, the first license is an operating system license, and is used to perform activation authentication on the operating system, or when the software in the first software operating environment is the application software, the first license is a software license, and is used to perform activation authentication on the application software. In the following embodiments of this application, an example in which the software in the first software operating environment is the operating system is used for description. For a case in which the software in the first software operating environment is the application software, refer to a case in which the software in the first software operating environment is the operating system. Details are not described in this embodiment of this application.

In step 202, the first client image file is configured based on the first license to generate a first cloud platform image file, where the first cloud platform image file carries a no-charging identifier.

Optionally, before step 202 is performed, an implementation process of the virtual machine management method for the cloud platform further includes, after obtaining the first client image file, detecting, by the cloud platform, whether the image format of the first client image file supports large-scale mounting, if the image format of the first client image file does not support large-scale mounting, performing image format conversion processing on the first client image file, to enable a converted first client image file to support large-scale mounting, and performing mounting processing on the first client image file that supports large-scale mounting.

It should be noted that, after the mounting processing is performed on the first client image file, an image file conversion node in the cloud platform performs background permission processing on the first client image file. In other words, step 202 is performed.

Optionally, when the software in the first software operating environment is an operating system, an implementation process of step 202 includes obtaining a first script based on the first license, and setting the first script in the first client image file, to obtain the first cloud platform image file.

The first script is used to, when the first virtual machine is started, detect whether a second license is set on an operating system of the first virtual machine, and if the second license is set on the operating system of the first virtual machine, clear the second license, and set the first license on the operating system, or if the second license is not set on the operating system of the first virtual machine, set the first license on the operating system.

Optionally, the second license is a license provided by the cloud platform.

It should be noted that, when the first virtual machine is started, it is detected whether the license provided by the cloud platform is set on the operating system of the first virtual machine, and if the license provided by the cloud platform is set on the operating system of the first virtual machine, the license is cleared. This can prevent the client from stealing the license provided by the cloud platform after exporting the operating system from the virtual machine of the cloud platform.

Optionally, when the operating system is a WINDOWS® operating system, the first script is used to, when the first virtual machine is started, detect whether the second license is set in a registry of the WINDOWS® operating system of the first virtual machine, and if the second license is set in the registry, clear the second license in the registry, set the first license in the registry, and activate the first license in the registry, or if the second license is not set in the registry, set the first license in the registry, and activate the first license in the registry.

For example, in the Bring Your Own License mode, when the operating system is a WINDOWS® operating system, the first script is a script for clearing the license provided by the cloud platform. The first script is delactivesys.bat, and delactivesys.bat is imported offline into the registry when the image file conversion node performs background permission processing on the client image file, to obtain a delactivesys.reg registry. When the first virtual machine is started, a C:\\WINDOWS\\System32\\delactivesys.bat script is triggered for execution.

Content of the delactivesys.reg registry that is imported offline is as follows:
WINDOWS Registry Editor Version 5.00
[HKEY_LOCAL_MACHINE\SOFTWARE\
  Microsoft\WINDOWS \CurrentVersion\Run]
"delactivesystem"="C:
  \\WINDOWS\\System32\\delactivesys.bat."

After the first virtual machine is started, the cloud platform first calls C:\WINDOWS\system32\x64\delactivesys.bat to start a C:\WINDOWS\System32\DelActiveSystem.cmd script to clear the license provided by the cloud platform, and then restores a related registry and clears an imported script file (delactivesys.bat and DelActiveSystem.cmd). The delactivesys.bat script and the DelActiveSystem.cmd script are imported offline into a C:\WINDOWS\System32 directory when the image file conversion node performs background permission processing on the delactivesys.bat script and the DelActiveSystem.cmd script.

Content of the delactivesys.bat script that is imported offline by the image file conversion node is as follows:
@echo off
rem: call a script used to clear and activate an operating system
call C:\WINDOWS\System32\DelActiveSystem.cmd
rem: set a path variable of a file to be deleted
Set DelSysFile="C:\WINDOWS\system32\DelActiveSystem.cmd"
Set DelActiveFile="c:\WINDOWS\system32\x64\delactivesys.bat"
rem: restore a registry
reg delete "HKEY_LOCAL_MACHINE\SOFTWARE\Microsoft\WINDOWS \CurrentVersion\Run"/v"delactivesystem"/f
rem: clear a residual file
if exist %DelActiveFile% (del %DelActiveFile%)
if exist %DelSysFile% (del %DelSysFile%).

Content of the DelActiveSystem.cmd script that is imported offline by the image file conversion node is as follows:
rem cmd
rem: clear a script used to activate a platform
cscript/nologo "C:\WINDOWS\system32\slmgr.vbs"/upk
cscript/nologo "C:\WINDOWS\system32\slmgr.vbs"/ckms.

Optionally, when the operating system is a LINUX operating system, the first script is used to, when the first virtual machine is started, detect whether a second license is set in a software repository configuration file of the LINUX operating system of the first virtual machine, and if the second license is set in the software repository configuration file, clear the second license in the software repository configuration file, and set the first license in the software repository configuration file, or if the second license is not set in the software repository configuration file, set the first license in the software repository configuration file.

For example, in the Bring Your Own License mode, when the operating system is a LINUX operating system, a software repository configuration file in a yum or zypper configuration directory in the operating system is read to check whether a software package source address and the license provided by the cloud platform exist. If the software package source address and the license exist, the software package source address and the license are cleared.

In step 203, the first virtual machine is created based on the first cloud platform image file, where the first software operating environment is set on the first virtual machine, and the first virtual machine carries the no-charging identifier.

The first virtual machine is configured to provide an operating environment of the software in the first cloud platform image file.

Optionally, the no-charging identifier may be represented by a letter, a number, a character string, or the like. For example, the no-charging identifier may be denoted as "byol". A representation form of the no-charging identifier is not limited in this embodiment of this application.

In step 204, a license fee of the software in the first software operating environment in the first virtual machine is exempted based on the no-charging identifier.

According to the virtual machine management method for the cloud platform provided in this embodiment of this application, for a WINDOWS® operating system in a Bring Your Own License mode, license clearing is performed on the client image file, to prevent the client from stealing the license provided by the cloud platform and exempt a license fee for activating and running the WINDOWS® operating system. For a LINUX operating system in a Bring Your Own License mode, software package source address clearing and license clearing are performed on the software repository configuration file of the client image file, to prevent the client from stealing the software package source service provided by the cloud platform and exempt a license fee for running the LINUX operating system. According to the cloud platform provided in this embodiment of this application, in an execution process of the virtual machine management method procedure, the cloud platform automatically creates the virtual machine and activates software in the virtual machine based on the first license. In other words, this implements fully automatic processing on the first client image file, improves convenience of switching an enterprise service to the cloud, and further improves user experience. In addition, a migration to the cloud service in a Bring Your Own License mode is provided to enable an enterprise to be smoothly switched to the cloud, and no additional license fee of software in a Bring Your Own License mode is charged. This reduces maintenance and operation costs of the enterprise.

Figure 7:
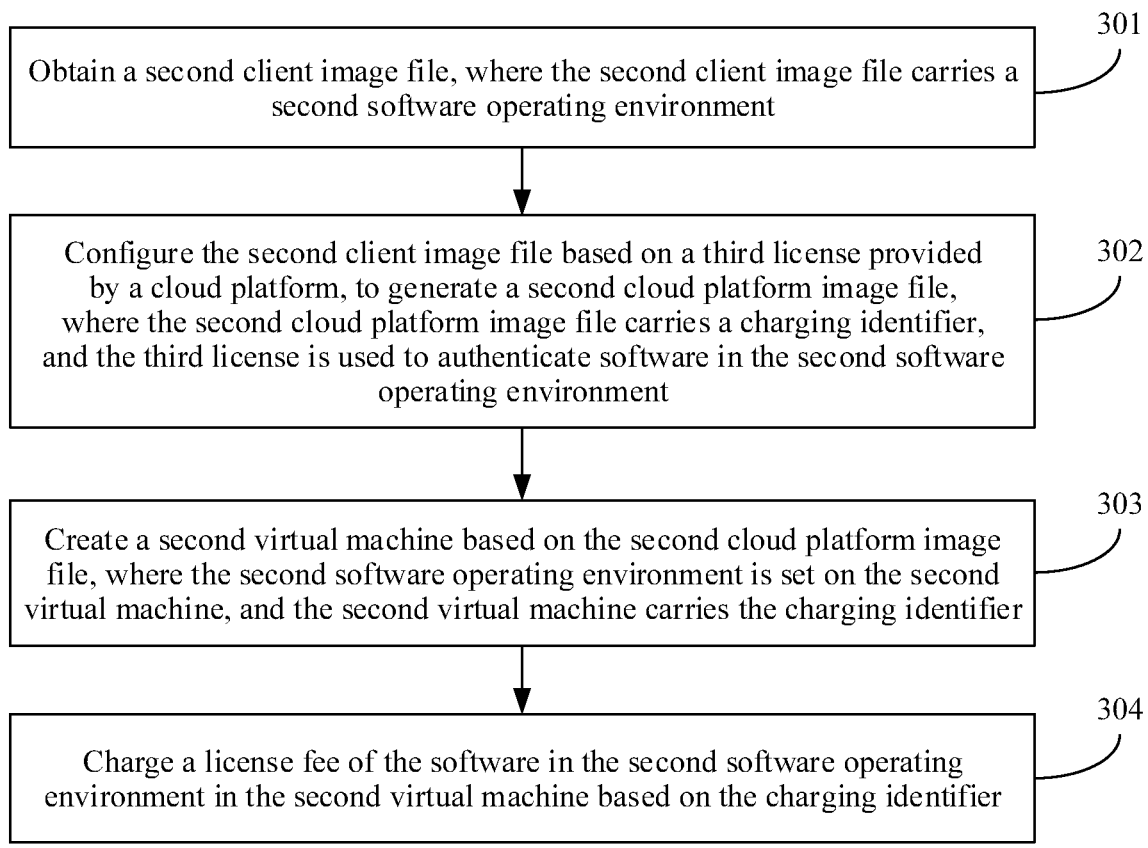
FIG. 7 is a flowchart of a virtual machine management method for another cloud platform according to an embodiment of this application.

FIG. 7 is a flowchart of a virtual machine management method for a cloud platform corresponding to a BLEP mode according to an embodiment of this application. The method may be applied to the cloud platform 00 in the system shown in FIG. 1. As shown in FIG. 7, the method includes the following steps.

In step 301, a second client image file is obtained, where the second client image file carries a second software operating environment.

Optionally, the second client image file is sent by a second client to the cloud platform. An image format of the second client image file may be a community format such as vhd, qcow2, zvhd, or vmdk. An image format of the second client image file is not limited in this embodiment of this application.

Optionally, software in the second software operating environment may be an operating system or application software.

In step 302, the second client image file is configured based on a third license provided by the cloud platform to generate a second cloud platform image file, where the second cloud platform image file carries a charging identifier, and the third license is used to authenticate software in the second software operating environment.

Optionally, when the software in the second software operating environment is the operating system, the second license is an operating system license, and is used to perform activation authentication on the operating system, or when the software in the second software operating environment is the application software, the second license is a software license, and is used to perform activation authentication on the application software. In the following embodiments of this application, an example in which the software in the second software operating environment is the operating system is used for description. For a case in which the software in the second software operating environment is the application software, refer to a case in which the software in the second software operating environment is the operating system. Details are not described in this embodiment of this application.

Optionally, before step 302 is performed, an implementation process of the virtual machine management method for the cloud platform further includes, after obtaining the second client image file, detecting, by the cloud platform, whether the image format of the second client image file supports large-scale mounting, if the image format of the second client image file does not support large-scale mounting, performing image format conversion processing on the second client image file, to enable a converted first client image file to support large-scale mounting, and performing mounting processing on the second client image file that supports large-scale mounting.

Optionally, when the software in the second software operating environment is an operating system, an implementation process of step 302 includes obtaining a second script based on the third license, and setting the second script in the second client image file, to obtain the second cloud platform image file.

The second script is used to, when the second virtual machine is started, detect whether a fourth license is set on an operating system of the second virtual machine, and if the fourth license is set on the operating system of the second virtual machine, clear the fourth license, and set the third license on the operating system, or if the fourth license is not set on the operating system of the second virtual machine, set the third license on the operating system.

Optionally, the fourth license may be a license provided by the second client or another cloud platform. In other words, the fourth license is a license provided by a platform other than the cloud platform provided in this embodiment of this application. If the fourth license is set on the operating system of the second virtual machine, the cloud platform clears the fourth license and sets the third license in the operating system. Alternatively, the cloud platform overwrites the fourth license with the third license.

Optionally, when the operating system is a WINDOWS® operating system, the second script is used to, when the second virtual machine is started, detect whether the fourth license is set in a registry of the WINDOWS® operating system of the second virtual machine, and if the fourth license is set in the registry, clear the fourth license in the registry, set the third license in the registry, and activate the third license in the registry, or if the fourth license is not set in the registry, set the third license in the registry, and activate the third license in the registry.

For example, in the BLEP mode, when the operating system is a WINDOWS® operating system, the second script is a script for activating the license. The second script is an activesys.bat script, and the activesys.bat script is imported offline into the registry when the image file conversion node performs background permission processing on the client image file, to obtain an activesys.reg registry. When the first virtual machine is started, a C:\\WINDOWS \\System32\\activesys.bat script is triggered for execution.

Content of the activesys.reg registry that is imported offline is as follows:
WINDOWS Registry Editor Version 5.00
[HKEY_LOCAL_MACHINE\SOFTWARE\
Microsoft\WINDOWS \CurrentVersion\Run]
"activesystem"=
"C:\\WINDOWS\\System32\\activesys.bat."

After the first virtual machine is started, the cloud platform first calls C:\WINDOWS \system32\x64\activesys.bat to start a C:\WINDOWS\System32\ActiveSystem.cmd script to activate the license, and then restores a related registry and clears an imported script file (activesys.bat and ActiveSystem.cmd). The activesys.bat script and the ActiveSystem.cmd script are imported offline into a C:\WINDOWS\System32 directory when the image file conversion node performs background permission processing on the activesys.bat script and the ActiveSystem.cmd script.

Content of the activesys.bat script that is imported offline by the image file conversion node is as follows:
@echo off
rem: call a script used to activate an operating system
call C:\WINDOWS\System32\ActiveSystem.cmd
rem: set a path variable of a file to be deleted
Set SysFile="C:\WINDOWS\system32\ActiveSystem.cmd"
Set ActiveFile="c:\WINDOWS\system32\x64\activesys.bat"
rem: restore a registry
reg delete "HKEY_LOCAL_MACHINE\SOFTWARE\Microsoft\WINDOWS \CurrentVersion\Run"/v"activesystem"/f
rem: clear a residual file
if exist %ActiveFile% (del %ActiveFile%)
if exist %SysFile% (del %SysFile%)

Content of the ActiveSystem.cmd script that is imported offline by the image file conversion node is as follows:
@echo off
echo "Activing the System Now"
$strKMSSrv="xx.xx.xx.xx"
$strKEY="48HP8-DN98B-MYWDG-T2DCC-8W83P"
$env:WINDIE="C:\WINDOWS"
rem: platform KMS activation
csript/nologo "$env:WINDIE\system32\slmgr.vbs"/ipk $strKEY
csript/nologo "$env:WINDIE\system32\slmgr.vbs"/skms $strKMSSrv
csript/nologo "$env:WINDIE\system32\slmgr.vbs"/skms/ato.

strKMSSrv indicates an address or a domain name of a KMS server. strKEY indicates a KMS activation serial number of a client version corresponding to each WINDOWS® operating system.

Optionally, when the operating system is a LINUX operating system, the second script is used to, when the second virtual machine is started, detect whether a fourth license is set in a software repository configuration file of the LINUX operating system of the second virtual machine, and if the fourth license is set in the software repository configuration file, clear the fourth license in the software repository configuration file, and set the third license in the software repository configuration file, or if the fourth license is not set in the software repository configuration file, set the third license in the software repository configuration file.

For example, in the BLEP mode, when the operating system is a LINUX operating system, configuration files/etc/redhat-release, /etc/SuSE-release, and/etc/oracle-release are respectively read to identify an operating system version, and a software package source configuration (including a software package source address and a license) provided by a corresponding platform is implanted into a corresponding yum or zypper configuration directory.

In step 303, a second virtual machine is created based on the second cloud platform image file, where the second software operating environment is set on the second virtual machine, and the second virtual machine carries the charging identifier.

The second virtual machine is configured to provide an operating environment of the software in the second cloud platform image file.

Optionally, the charging identifier may be represented by a letter, a number, a character string, or the like. A representation form of the charging identifier is not limited in this embodiment of this application. Optionally, an operating system platform of the WINDOWS® operating system is a WINDOWS® platform, and an operating system platform of the LINUX operating system may be divided into platforms such as a software and systems development (SUSE) platform, a REDHAT® platform, and an ORACLE® LINUX platform. In this embodiment of this application, the charging identifier may be set based on a type of the operating system platform. For example, a charging identifier of the WINDOWS® platform may be denoted as "win", a charging identifier of the SUSE platform may be denoted as "suse", a charging identifier of the REDHAT® platform may be denoted as "redhat", and a charging identifier of the ORACLE® LINUX platform may be denoted as "oracle". It should be noted that a granularity of dividing the charging identifier is not limited in this embodiment of this application, and granularity division may be performed based on a charging requirement. For example, each operating system platform has a plurality of operating system versions. For example, the WINDOWS® platform includes versions such as server 2016 standard/datacenter 64 bit, and the charging identifier may also be set based on the operating system version.

In step 304, a license fee of the software in the second software operating environment in the second virtual machine is charged based on the charging identifier.

It should be noted that, according to the virtual machine management method for the cloud platform provided in this embodiment of this application, for a WINDOWS® operating system for which a license is purchased by the platform, a platform license is implanted into the client image file, and subsequently, when a created virtual machine is started, KMS is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier. In an execution process of the virtual machine management method procedure, the cloud platform automatically creates the virtual machine and activates software in the virtual machine based on the third license provided by the cloud platform. In other words, this implements fully automatic processing on the second client image file, improves convenience of switching an enterprise service to the cloud, and further improves user experience.

The first client and the second client may be a same client, or may be different clients. This is not limited in this embodiment of this application. Because the cloud platform provided in this embodiment of this application supports both a Bring Your Own License mode and a Buy License From Platform mode, step 201 to step 204 and step 301 to step 304 may be separately performed, or may be performed in combination. When the foregoing step 201 to step 204 are performed in combination with the foregoing step 301 to step 304, the foregoing step 201 to step 204 may be performed before the foregoing step 301 to step 304, or may be performed after the foregoing step 301 to step 304.

It should be noted that a sequence of steps in the virtual machine management method for the cloud platform provided in this embodiment of this application may be properly adjusted, and steps may be correspondingly added or deleted based on a situation. Any variation readily figured out by persons skilled in the art within the technical scope disclosed in this application shall fall within the protection scope of this application, and details are not described herein.

In conclusion, according to the virtual machine management method for the cloud platform provided in this embodiment of this application, the cloud platform is compatible with a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates the virtual machine and activates software in the virtual machine based on the license. In other words, this implements fully automatic processing on the client image file, improves convenience of switching an enterprise service to the cloud, and further improves user experience. For a WINDOWS® operating system in a Bring Your Own License mode, license clearing is performed on the client image file, to prevent the client from stealing the license provided by the cloud platform and exempt a license fee for activating and running the WINDOWS® operating system. For a LINUX operating system in a Bring Your Own License mode, software package source address clearing and license clearing are performed on the software repository configuration file of the client image file, to prevent the client from stealing the software package source service provided by the cloud platform and exempt a license fee for running the LINUX operating system. According to the cloud platform provided in this embodiment of this application, a migration to the cloud service in a Bring Your Own License mode is provided to enable an enterprise to be smoothly switched to the cloud, and no additional license fee of software in a Bring Your Own License mode is charged. This reduces maintenance and operation costs of the enterprise. For a WINDOWS® operating system for which a license is purchased by the platform, a platform license is implanted into the client image file, and subsequently, when a created virtual machine is started, KMS is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier.

Figure 8:
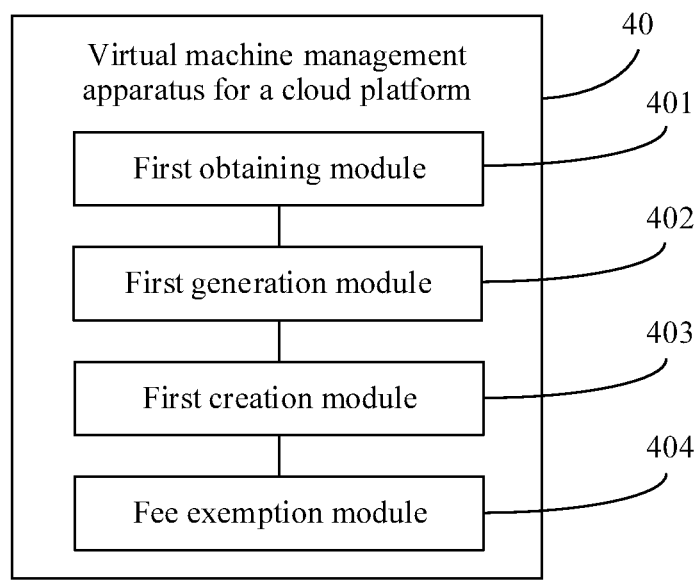
FIG. 8 is a schematic structural diagram of a virtual machine management apparatus for a cloud platform according to an embodiment of this application.

FIG. 8 is a schematic structural diagram of a virtual machine management apparatus for a cloud platform according to an embodiment of this application. As shown in FIG. 8, the apparatus 40 includes a first obtaining module 401, configured to obtain a first client image file and a first license, where the first client image file carries a first software operating environment, and the first license is used to authenticate software in the first software operating environment, a first generation module 402, configured to configure the first client image file based on the first license to generate a first cloud platform image file, where the first cloud platform image file carries a no-charging identifier, a first creation module 403, configured to create a first virtual machine based on the first cloud platform image file, where the first software operating environment is set on the first virtual machine, and the first virtual machine carries the no-charging identifier, and a fee exemption module 404, configured to exempt a license fee of the software in the first software operating environment in the first virtual machine based on the no-charging identifier.

Optionally, the software in the first software operating environment is an operating system, and the first generation module is configured to obtain a first script based on the first license, and set the first script in the first client image file, to obtain the first cloud platform image file, where the first script is used to, when the first virtual machine is started, detect whether a second license is set on an operating system of the first virtual machine, and if the second license is set on the operating system of the first virtual machine, clear the second license, and set the first license on the operating system, or if the second license is not set on the operating system of the first virtual machine, set the first license on the operating system.

Optionally, the operating system is a WINDOWS® operating system, and the first script is used to, when the first virtual machine is started, detect whether the second license is set in a registry of the WINDOWS® operating system of the first virtual machine, and if the second license is set in the registry, clear the second license in the registry, set the first license in the registry, and activate the first license in the registry, or if the second license is not set in the registry, set the first license in the registry, and activate the first license in the registry.

Optionally, the operating system is a LINUX operating system, and the first script is used to, when the first virtual machine is started, detect whether a second license is set in a software repository configuration file of the LINUX operating system of the first virtual machine, and if the second license is set in the software repository configuration file, clear the second license in the software repository configuration file, and set the first license in the software repository configuration file, or if the second license is not set in the software repository configuration file, set the first license in the software repository configuration file.

Figure 9:
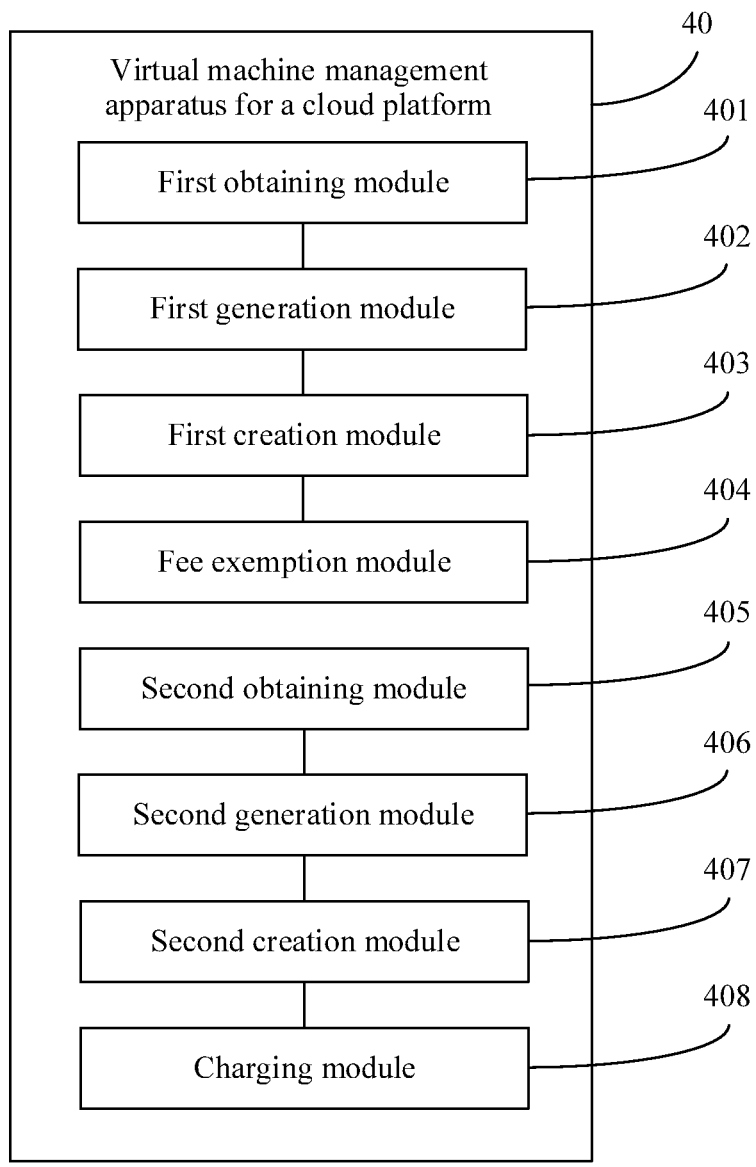
FIG. 9 is a schematic structural diagram of a virtual machine management apparatus for another cloud platform according to an embodiment of this application.

Optionally, as shown in FIG. 9, the apparatus 40 further includes a second obtaining module 405, configured to obtain a second client image file, where the second client image file carries a second software operating environment, a second generation module 406, configured to configure the second client image file based on a third license provided by the cloud platform to generate a second cloud platform image file, where the second cloud platform image file carries a charging identifier, and the third license is used to authenticate software in the second software operating environment, a second creation module 407, configured to create a second virtual machine based on the second cloud platform image file, where the second software operating environment is set on the second virtual machine, and the second virtual machine carries the charging identifier, and a charging module 408, configured to charge a license fee of the software in the second software operating environment in the second virtual machine based on the charging identifier.

In conclusion, according to the virtual machine management apparatus for the cloud platform provided in this embodiment of this application, the cloud platform is compatible with a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates the virtual machine and activates software in the virtual machine based on the license. In other words, this implements fully automatic processing on the client image file, improves convenience of switching an enterprise service to the cloud, and further improves user experience. For a WINDOWS® operating system in a Bring Your Own License mode, license clearing is performed on the client image file, to prevent the client from stealing the license provided by the cloud platform and exempt a license fee for activating and running the WINDOWS® operating system. For a LINUX operating system in a Bring Your Own License mode, software package source address clearing and license clearing are performed on the software repository configuration file of the client image file, to prevent the client from stealing the software package source service provided by the cloud platform and exempt a license fee for running the LINUX operating system. According to the cloud platform provided in this embodiment of this application, a migration to the cloud service in a Bring Your Own License mode is provided to enable an enterprise to be smoothly switched to the cloud, and no additional license fee of software in a Bring Your Own License mode is charged. This reduces maintenance and operation costs of the enterprise. For a WINDOWS® operating system for which a license is purchased by the platform, a platform license is implanted into the client image file, and subsequently, when a created virtual machine is started, KMS is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier.

Figure 10:
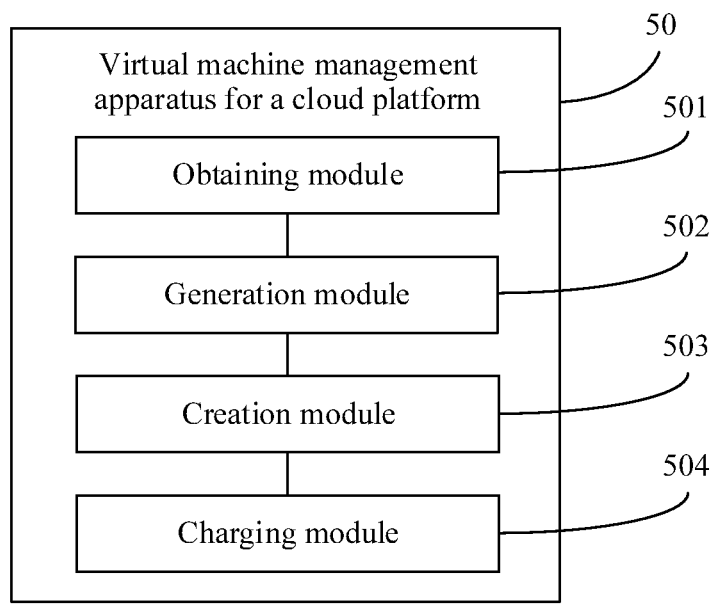
FIG. 10 is a schematic structural diagram of a virtual machine management apparatus for a cloud platform according to another embodiment of this application.

FIG. 10 is a schematic structural diagram of a virtual machine management apparatus for a cloud platform according to another embodiment of this application. As shown in FIG. 10, the apparatus 50 includes an obtaining module 501, configured to obtain a second client image file, where the second client image file carries a second software operating environment, a generation module 502, configured to configure the second client image file based on a third license provided by the cloud platform to generate a second cloud platform image file, where the second cloud platform image file carries a charging identifier, and the third license is used to authenticate software in the second software operating environment, a creation module 503, configured to create a second virtual machine based on the second cloud platform image file, where the second software operating environment is set on the second virtual machine, and the second virtual machine carries the charging identifier, and a charging module 504, configured to charge a license fee of the software in the second software operating environment in the second virtual machine based on the charging identifier.

Optionally, the software in the second software operating environment is an operating system, and the generation module is configured to obtain a second script based on the third license, and set the second script in the second client image file, to obtain the second cloud platform image file, where the second script is used to, when the second virtual machine is started, detect whether a fourth license is set on an operating system of the second virtual machine, and if the fourth license is set on the operating system of the second virtual machine, clear the fourth license, and set the third license on the operating system, or if the fourth license is not set on the operating system of the second virtual machine, set the third license on the operating system.

Optionally, the operating system is a WINDOWS® operating system, and the second script is used to, when the second virtual machine is started, detect whether the fourth license is set in a registry of the WINDOWS® operating system of the second virtual machine, and if the fourth license is set in the registry, clear the fourth license in the registry, set the third license in the registry, and activate the third license in the registry, or if the fourth license is not set in the registry, set the third license in the registry, and activate the third license in the registry.

Optionally, the operating system is a LINUX operating system, and the second script is used to, when the second virtual machine is started, detect whether a fourth license is set in a software repository configuration file of the LINUX operating system of the second virtual machine, and if the fourth license is set in the software repository configuration file, clear the fourth license in the software repository configuration file, and set the third license in the software repository configuration file, or if the fourth license is not set in the software repository configuration file, set the third license in the software repository configuration file.

In conclusion, according to the virtual machine management apparatus for the cloud platform provided in this embodiment of this application, the cloud platform is compatible with a migration service in a Bring Your Own License mode and a migration service in a Buy License From Platform mode. The cloud platform may execute a corresponding virtual machine management method procedure based on a mode selected by a client. This improves flexibility of migrating data to the cloud. In an execution process of the virtual machine management method procedure, the cloud platform automatically creates the virtual machine and activates software in the virtual machine based on the license. In other words, this implements fully automatic processing on the client image file, improves convenience of switching an enterprise service to the cloud, and further improves user experience. For a WINDOWS® operating system for which a license is purchased by the platform, a platform license is implanted into the client image file, and subsequently, when a created virtual machine is started, KMS is automatically performed to activate the operating system, and a corresponding license fee is deducted based on the charging identifier, and for a LINUX operating system for which a license is purchased by the platform, a platform software package source address and a platform license are implanted into the client image file, and subsequently, when a created virtual machine is started, the operating system running on the virtual machine can directly use the software package source service, and a corresponding license fee is deducted by the cloud platform based on the charging identifier.

An embodiment of this application provides a virtual machine management apparatus for a cloud platform, and the apparatus includes a storage unit, configured to store an instruction, and at least one processor, coupled to the storage unit, where when the at least one processor executes the instruction, the virtual machine management method for the cloud platform shown in FIG. 6 is implemented, or the virtual machine management method for the cloud platform shown in FIG. 7 is implemented.

Optionally, the apparatus may be a physical server. For a software and hardware deployment status of the apparatus, refer to FIG. 2. For a hardware composition status of the apparatus, refer to FIG. 3. Details are not described herein again in this application.

An embodiment of this application provides a computer-readable storage medium. The computer-readable storage medium stores an instruction, and when the instruction is executed by a processor, the virtual machine management method for the cloud platform shown in FIG. 6 is implemented, or the virtual machine management method for the cloud platform shown in FIG. 7 is implemented.

Persons of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, comprising:
providing, by a cloud platform, an Object Storage Service (OSS) user bucket, wherein the cloud platform is a cloud server or a cloud server cluster comprising multiple cloud servers;
providing, by the cloud platform, a Bring Your Owner License option and a Buy License from Platform option;
receiving, by the cloud platform, an instruction for triggering the Bring Your Owner License option;
generating, by the cloud platform and in response to the Bring Your Owner License option, a cloud platform image file according to a client image file in the OSS user bucket, wherein the client image file is received from a client by the OSS user bucket before the cloud platform image file is generated, wherein the client image file carries a software operating environment and a license, and wherein the license authenticates software in the software operating environment;
creating, by the cloud platform and according to the cloud platform image file, a virtual machine comprising the software operating environment and the license; and
exempting, by the cloud platform, wherein a license fee of software running on the virtual machine.

2. The method of claim 1, further comprising providing, by the cloud platform, an image file upload box, a name text box, and an operating system version selection box, wherein the image file upload box is configured to receive the client image file, wherein the name text box receives a name of the client image file, and wherein the operating system version selection box is configured to receive a selection of an operating system version of the client image file.

3. The method of claim 1, wherein the software in the software operating environment is an operating system.

4. The method of claim 1, wherein the software in the software operating environment is an application software.

5. The method of claim 1, wherein a format of the cloud platform image file is a qcow2 format or a zvhd format.

6. The method of claim 1, wherein a format of the client image file is one of a vhd format, a qcow2 format, a zvhd format, or a vmdk format.

7. A method, comprising:
providing, by a cloud platform, an Object Storage Service (OSS) user bucket, wherein the cloud platform is a cloud server or a cloud server cluster comprising multiple cloud servers;

providing, by the cloud platform, a Bring Your Owner License option and a Buy License from Platform option;
receiving, by the cloud platform, an instruction for triggering the Buy License from Platform option;
generating, by the cloud platform and in response to the Buy License from Platform option, a cloud platform image file according to a client image file in the OSS user bucket, wherein the client image file is received from a client by the OSS user bucket before the cloud platform image file is generated, and wherein the client image file carries a software operating environment;
creating, by the cloud platform and according to the cloud platform image file, a virtual machine comprising the software operating environment; and
providing, by the cloud platform, a license for the software operating environment in the virtual machine, wherein the license authenticates the software in the software operating environment of the virtual machine.

8. The method of claim 7, further comprising providing, by the cloud platform, an image file upload box, a name text box, and an operating system version selection box, wherein the image file upload box receives the client image file, wherein the name text box receives a name of the client image file, and wherein the operating system version selection box is configured to receive a selection of an operating system version of the client image file.

9. The method of claim 7, wherein the software in the software operating environment is an operating system.

10. The method of claim 7, wherein the software in the software operating environment is an application software.

11. The method of claim 7, wherein a format of the cloud platform image file is a qcow2 format or a zvhd format.

12. The method of claim 7, wherein a format of the client image file is one of a vhd format, a qcow2 format, a zvhd format, or a vmdk format.

13. The method of claim 7, wherein a license fee of the software running on the virtual machine is charged in the cloud platform.

14. An apparatus, comprising
a processor; and
a memory coupled to the processor and storing instructions that, when executed by the processor, cause the apparatus to be configured to:
provide an Object Storage Service (OSS) user bucket;
provide a Bring Your Owner License option and a Buy License from Platform option;
receive an instruction for triggering the Bring Your Owner License option;
generate, in response to the Bring Your Owner License option, a cloud platform image file according to a client image file in the OSS user bucket, wherein the client image file is received from a client by the OSS user bucket before the cloud platform image file is generated, wherein the client image file carries a software operating environment and a license, and wherein the license authenticates software in the software operating environment; and
exempt a license fee of software running on a virtual machine.

15. The apparatus of claim 14, wherein the instructions further cause the processor to provide an image file upload box, a name text box, and an operating system version selection box, wherein the image file upload box is configured to receive the client image file, wherein the name text box receives a name of the client image file, and wherein the operating system version selection box is configured to receive a selection of an operating system version of the client image file.

16. The apparatus of claim 14, wherein the software in the software operating environment is an operating system.

17. The apparatus of claim 14, wherein the software in the software operating environment is an application software.

18. The apparatus of claim 14, wherein a format of the cloud platform image file is a qcow2 format or a zvhd format.

19. The apparatus of claim 14, wherein a format of the client image file is one of a vhd format, a qcow2 format, a zvhd format, or a vmdk format.

20. An apparatus, comprising:
a processor; and
a memory coupled to the processor and storing instructions that, when executed by the processor, cause the apparatus to be configured to:
provide an Object Storage Service (OSS) user bucket;
provide a Bring Your Owner License option and a Buy License from Platform option;
receive an instruction for triggering the Buy License from Platform option; and
generate, in response to the Buy License from Platform option, a cloud platform image file according to a client image file in the OSS user bucket, wherein the client image file is received from a client by the OSS user bucket before the cloud platform image file is generated, and wherein the client image file carries a software operating environment;
create a virtual machine comprising the software operating environment according to the cloud platform image file; and
provide a license for the software operating environment in the virtual machine, wherein the license authenticates software in the software operating environment of the virtual machine.

21. The apparatus of claim 20, wherein the instructions further cause the processor to provide an image file upload box, a name text box, and an operating system version selection box, wherein the image file upload box receives the client image file, wherein the name text box receives a name of the client image file, and wherein the operating system version selection box is configured to receive a selection of an operating system version of the client image file.

22. The apparatus of claim 20, wherein the software in the software operating environment is an operating system.

23. The apparatus of claim 20, wherein the software in the software operating environment is an application software.

24. The apparatus of claim 20, wherein a format of the cloud platform image file is a qcow2 format or a zvhd format.

25. The apparatus of claim 20, wherein a format of the client image file is one of a vhd format, a qcow2 format, a zvhd format, or a vmdk format.

26. The apparatus of claim 20, wherein a license fee of the software running on the virtual machine is charged in a cloud platform.

* * * * *